May 2, 1939.  F. W. HALL  2,156,688
PROCESS AND APPARATUS FOR SEPARATING LAMINATED GLASS SHEETS
Filed March 4, 1938  3 Sheets-Sheet 1

INVENTOR.
FRANK W. HALL
BY Bradley & Bee
ATTORNEYS.

May 2, 1939.  F. W. HALL  2,156,688
PROCESS AND APPARATUS FOR SEPARATING LAMINATED GLASS SHEETS
Filed March 4, 1938    3 Sheets-Sheet 2
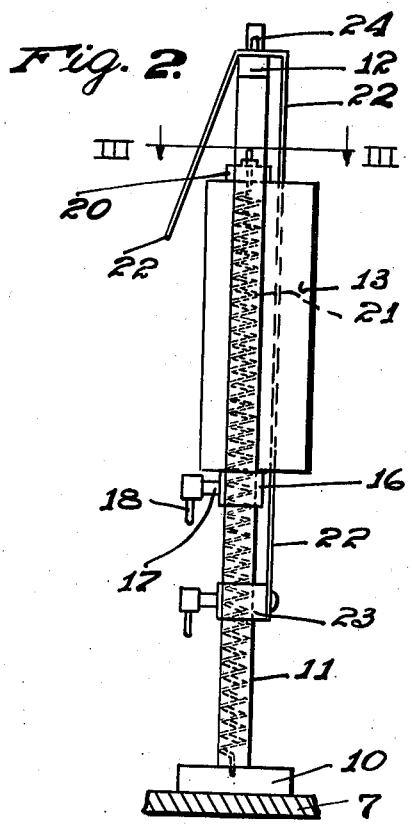
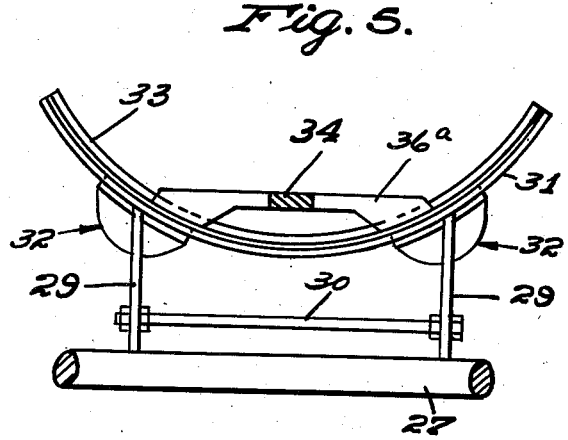
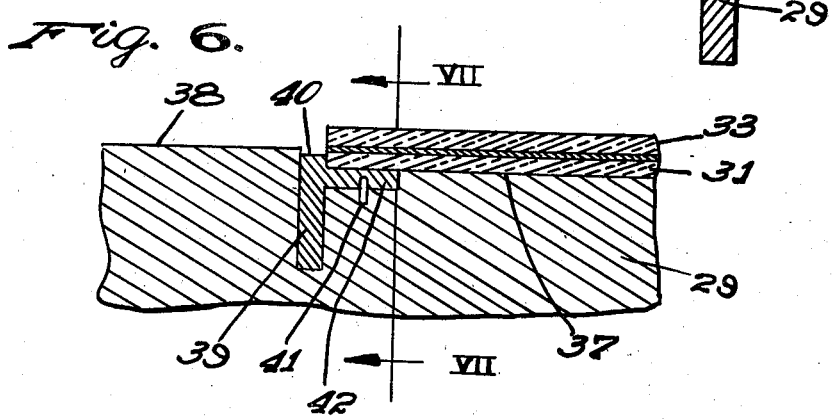
INVENTOR.
FRANK W. HALL
BY Bradley & Bee
ATTORNEYS.

May 2, 1939.                    F. W. HALL                     2,156,688
           PROCESS AND APPARATUS FOR SEPARATING LAMINATED GLASS SHEETS
                         Filed March 4, 1938        3 Sheets-Sheet 3
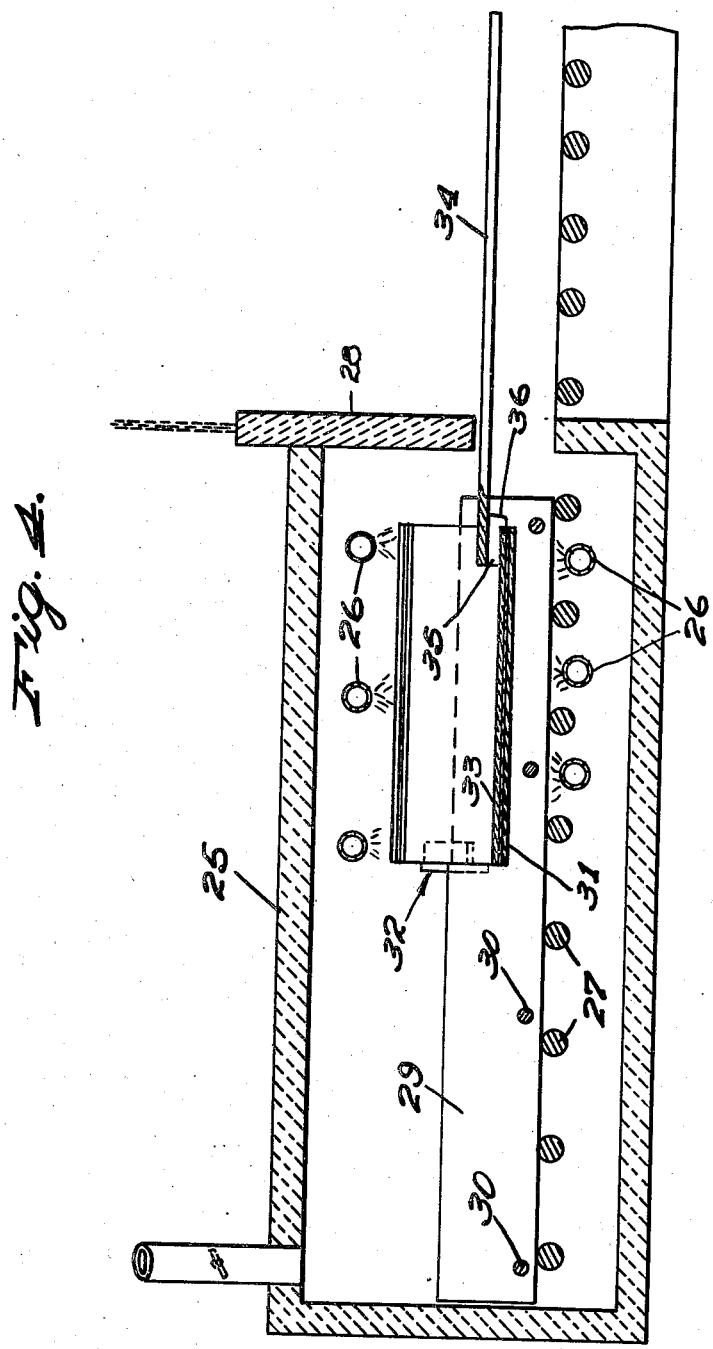
INVENTOR.
FRANK W. HALL
BY Bradley & Bee
ATTORNEYS.

Patented May 2, 1939

2,156,688

UNITED STATES PATENT OFFICE 2,156,688

PROCESS AND APPARATUS FOR SEPARATING LAMINATED GLASS SHEETS

Frank W. Hall, Tarentum, Pa., assignor to Pittsburgh Plate Glass Company, Allegheny County, Pa., a corporation of Pennsylvania Application March 4, 1938, Serial No. 193,951

6 Claims. (Cl. 49—81)

Figure 1:
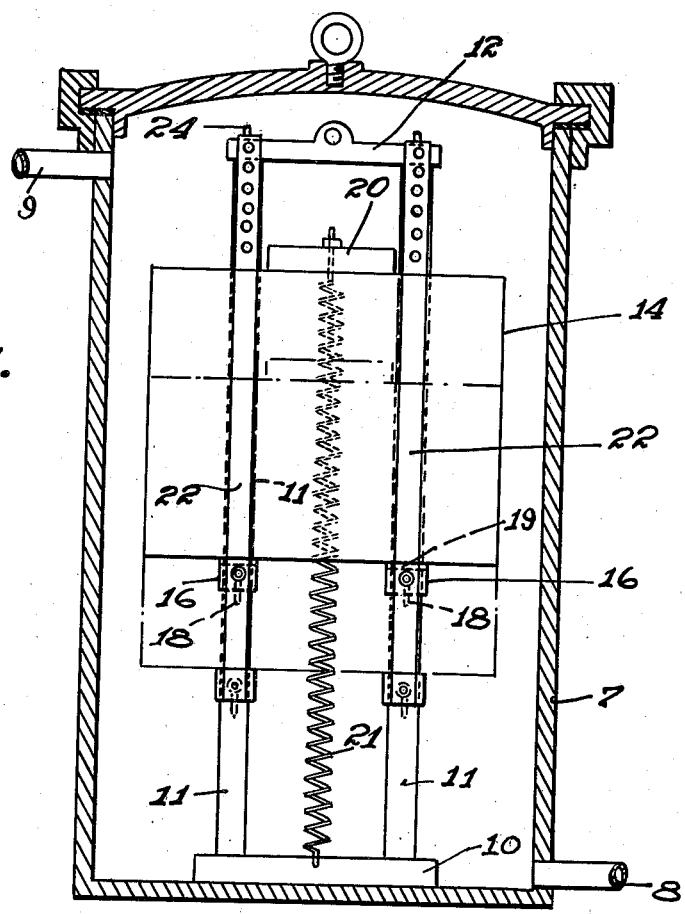
Figure 3:
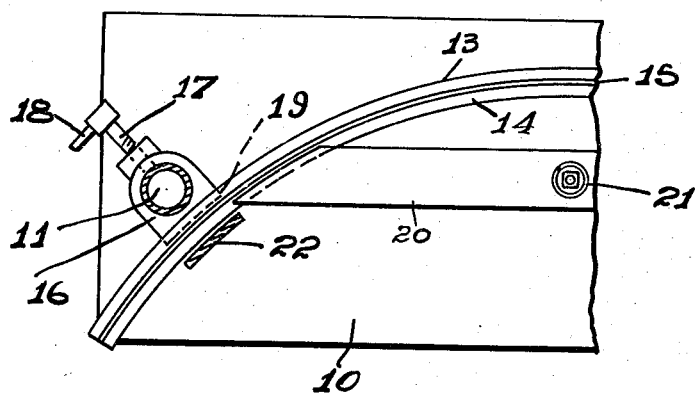

The invention relates to a process and apparatus for separating the sheets of a laminated safety glass plate in order to salvage the glass sheets. The difficulty in separating the sheets in a safety glass plate in order to salvage them depends on the character of the plastic. In salvaging safety glass in which the interlayer is one of the cellulose plastics, the separation has ordinarily been accomplished by placing the plate in an acid bath which works in from the edges and decomposes the plastic thus freeing the glass sheets. With other types of interlayer, including the resins, such as vinyl acetal, the acid procedure is not practicable due to the resistance of the resin to decomposition. Further, the acid is expensive, and disagreeable to handle and the separation requires a long period. One of the objects of the present invention is to provide a process not requiring the use of acid, which is applicable to the separation of laminated plates with all types of interlayers, including the resins, which can be practiced at a low cost and which is applicable to the separation of bent and flat laminated plates. A further object is the provision of a cheap simple apparatus for carrying out the process which requires a minimum amount of time and attention on the part of the operator, and which can be used witout danger of breakage or other injury to the reclaimed glass. Certain embodiments of the preferred apparatus are shown in the accompanying drawings, wherein:

Figure 1 is a vertical section through one form of apparatus. Fig. 2 is a side elevation of a part of the apparatus. Fig. 3 is an enlarged section on the line III—III of Fig. 2. Fig. 4 is a vertical section through a modified type of apparatus. Fig. 5 is an end elevation of part of the apparatus of Fig. 4. And Figs. 6 and 7 are enlarged detail views showing the stop construction employed in the construction of Figs. 4 and 5, Fig. 6 being a longitudinal section and Fig. 7 a transverse section on the line VII—VII of Fig. 6.

The apparatus in both modifications is shown as applied to the separation of the sheets of curved plates of safety glass, but it will be understood that the process is equally applicable to the separation of the glass sheets in flat safety glass, only slight modification being required in the apparatus in order to so apply the process. The process is especially valuable in connection with curved safety glass, since such glass, in most cases, can not be cut into smaller sections in order to salvage a portion of the product as is the case with flat safety glass.

Referring to the apparatus of Figs. 1, 2 and 3, 7 is a tank in which the process is carried out, the liquid employed in such tank being oil or some high boiling liquid so that relatively high temperatures may be employed without generating pressure. The tank is shown as provided with an inlet pipe 8 and an outlet pipe 9 to promote the circulation of the contents of the tank through a suitable heating apparatus which is not shown.

The frame for supporting the laminated sheets, 10 which are to be separated, comprises a base 10 mounted on the bottom of the tank and a pair of vertical posts 11, 11 tied together at the top by a cross member 12. In order to support the curved composite plate, whose sheets 13 and 14 are to be separated from the interlayer 15, a pair of sleeves 16, 16 are mounted upon the posts and held in any desired position of adjustment by means of the screws 17 having the operating handles 18. These sleeves each have a projecting toe 19 (Fig. 3) which extends beneath the lower edge of the limited plate and supports it in vertical position. As indicated in Fig. 3, the toes 19 project beneath only the plate 13, which lies next to the frame, the other glass plate 14 being free to move downward when the interlayer 15 is softened. Means are provided for applying downward pressure to the sheet 14 in the form of a bar 20 which extends transversely of the frame and engages the upper edge of the glass sheet 14. This bar is connected to the base by means of the coil spring 21, which is under suitable tension, so that when the parts are assembled, as indicated in Figs. 1 and 2, a substantial downward force is applied to the sheet 14, tending to move it downward relative to the sheet 13 which is supported upon the toes 19. In order to prevent the assembly or one of the sheets thereof from falling away from the frame, a pair of flexible guide bands 22, 22 are preferably employed, such bands being secured at their lower ends to the sleeves 23. These sleeves are clamped in position in the same manner as the sleeve 16. The upper ends of the bands 22 pass over the bar 12 and are secured at such upper ends by means of a pair of pins 24, which extend through perforations in the bands, thus making these bands adjustable and readily detachable. The sleeves 23 also perform another function, in that they serve as stops for limiting the downward movement of the sheet 14 when the sheet is loosened and slides downward over the sheet 13. This guards against the danger of the plate moving down too rapidly through the bath and striking the bottom of the tank in such manner as to cause breakage.

The temperature in the tank required to soften the interlayer will vary depending upon the character of such interlayer. In the case of a vinyl acetal interlayer, a satisfactory temperature has been found to range from 300 to 310 deg. F. When the temperature of the assembly approaches this point, the interlayer is softened to such an extent that the spring 21 moves the plate 14 downward past the plate 13, thus separating the sheets. Films of the resin still remain on the surfaces of the glass plates, but are easily removed by placing the plates in an acid bath for a short period of time. While it is possible to secure the separation of the sheets by gravity without the use of the spring 21, such spring is from a practical standpoint quite essential, in that the time required when the spring is used is much less than that necessary if the weight of the sheet 14 is depended upon to cause its downward movement to produce a separation from the sheet 13. There is thus a considerable saving in time and the heat losses in the tank are much less with this shortened period.

Figs. 4 to 7 illustrate the application of the process to the separation of the sheets of curved safety glass in a horizontal position and without the use of a liquid, such as is employed in the construction of Figs. 1 to 3. As a substitute for the tank heretofore described, the furnace 25 is used, such furnace being suitably heated by means of the gas burners 26 which bring the plates to be salvaged to the temperature necessary for softening the plastic material of the interlayer. The furnace is also provided with a roller runway 27 and has at one end a vertically movable door 28. The curved glass plate to be treated, is in this instance, supported upon a frame comprising a pair of plates 29, 29 secured together at intervals by the tie bars 30. The frame is supported upon the rollers 27 constituting the runway and is easily moved along such runway to carry the plate to be treated into the furnace in the position shown at Fig. 4 and to remove it when the separating operation is completed. The glass sheet 31 which engages the frame is held against endwise movement to the left by means of a pair of stop members 32, 32 which engage the sheet at its left hand end. These stop members do not extend inwardly toward the center of curvature of the assembly a sufficient distance to engage the end of the upper sheet 33 so that when the interlayer is softened, there is nothing to prevent the upper sheet 33 from being moved to the left onto the left hand end of the frame. This separating movement is accomplished by means of a push bar 34 having a portion 35 which rests upon the upper surface of the sheet 33 and a pair of fingers 36 which extend just far enough down to engage the edge of the sheet 33, such fingers being carried by a transverse bar 36a secured to the end of the rod, as indicated in Fig. 5. The heat conditions necessary are the same as in the constructions of Figs. 1 to 3, and when the proper temperature is secured, no difficulty is encountered in sliding the upper glass sheet of the pair off of the lower member of the pair so that it lies on the portion of the frame 29 to the left of the stop members 32, 32 (Fig. 4). When this separation has been accomplished, the door 28 is raised and the frame is run out of the furnace to the right on the rollers 27 which constitute the runway.

The construction of the stop members 32 is preferably as shown in Figs. 6 and 7, wherein 37 is the upper edge of the portion of the frame 29 which supports the assembly and 38 is the upper edge of the portion of the frame which supports the glass sheet 33 after it has been pushed to the left (Fig. 4) off of the sheet 31. The stop members are in the form of half discs 39, which fit removably in slots in the side members 29 and are provided with a toe 40 which engages the end of the lower sheet 31, as heretofore explained. A pair of pins 41 lying on either side of the plate 29 serve to prevent accidental displacement of the stop member. Each stop member is also provided with a flange portion 42 which fits around the outer surface of the sheet 31 at its end and thus acts to fix the distance which the flange or toe 40 projects upward, this distance being approximately the thickness of the sheet 31. As heretofore pointed out, both types of apparatus, with slight modification as to the form of the supporting frames for the assemblies, may be used for the separation of the sheets of flat safety glass.

What I claim is:

1. A process of separating two sheets of glass secured together by a non-shatter layer of plastic material, which consists in supporting the assembly with the edge of one of the sheets held against movement in the plane of the sheet, heating the assembly in a fluid, so as to soften the plastic material, and applying pressure to the edge of the other sheet in the plane thereof at its end which is remote from that at which the first sheet is held against movement, so as to cause said other sheet to slide over the first sheet and separate therefrom.

2. A process of separating two sheets of glass secured together by a non-shatter layer of plastic material, which consists in supporting the assembly in vertical position with the bottom edge of one sheet held against downward movement, heating the assembly and applying downward pressure to the upper edge of the other sheet, so as to cause such other sheet to slide downward over the first sheet and separate therefrom.

3. Apparatus for separating two sheets of glass secured together by a non-shatter layer of plastic material, comprising a frame for carrying the assembly, stop means on the frame for engaging the edge of the sheet which is next to the frame, means for heating the assembly so as to soften the plastic material, and means for applying pressure to the edge of the other sheet which is remote from the stop means and in the direction toward such stop means so as to cause such other sheet to slide over the first sheet when the plastic material is softened by the heat.

4. Apparatus for separating two sheets of glass secured together by a non-shatter layer of plastic material, comprising an upright frame for carrying the assembly in an upright position, stop means on the frame for engaging the lower edge of the sheet which is next to the frame, means for heating the assembly so as to soften the plastic material, and means for applying downward pressure to the upper edge of the other sheet so as to cause such other sheet to slide downward over the first sheet when the plastic material is softened by the heat.

5. Apparatus for separating two sheets of glass secured together by a non-shatter layer of plastic material, comprising an upright frame for carrying the assembly in an upright position, stop means on the frame for engaging the lower edge of the sheet which is next to the frame, means for heating the assembly so as to soften the plastic material, means for applying downward pressure to the upper edge of the other sheet so as to cause such other sheet to slide downward over the first sheet when the plastic material is softened by the heat, stop means on the frame for limiting the downward movement of said other sheet, and guide means on the frame for preventing the sheets from moving away from the frame in a lateral direction.

6. Apparatus for separating two sheets of glass secured together by a non-shatter layer of plastic material, comprising a vertical frame for carrying the assembly in an upright position, stop means projecting forwardly from the frame for engaging the lower horizontal edge of the glass sheet which lies next to the frame, leaving the corresponding edge of the other sheet unsupported, a bath of high boiling liquid surrounding the frame and assembly, and means for heating the bath to a temperature such that it will cause the plastic material to soften so that the unsupported sheet will slide downward over the supported sheet and separate therefrom.

FRANK W. HALL.